United States Patent
Steck

(10) Patent No.: US 10,187,674 B2
(45) Date of Patent: Jan. 22, 2019

(54) TARGETED PROMOTION OF ORIGINAL TITLES

(71) Applicant: NETFLIX, Inc., Los Gatos, CA (US)

(72) Inventor: Harald Steck, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 273 days.

(21) Appl. No.: 13/916,132

(22) Filed: Jun. 12, 2013

(65) Prior Publication Data

US 2014/0373047 A1    Dec. 18, 2014

(51) Int. Cl.
| | |
|---|---|
| *H04N 21/25* | (2011.01) |
| *H04N 21/81* | (2011.01) |
| *G06Q 30/02* | (2012.01) |

(52) U.S. Cl.
CPC ....... *H04N 21/251* (2013.01); *G06Q 30/0255* (2013.01); *H04N 21/812* (2013.01)

(58) Field of Classification Search
CPC ......... H04N 21/44204; H04N 21/4668; H04N 21/4826; H04N 21/812; H04N 21/251; H04N 21/44222; G06Q 30/0255
USPC ................................ 725/32–36, 46; 707/727
See application file for complete search history.

(56) References Cited

U.S. PATENT DOCUMENTS

| | | | |
|---|---|---|---|
| 2008/0127270 A1* | 5/2008 | Shipman et al. | ............... 725/46 |
| 2010/0083318 A1* | 4/2010 | Weare et al. | ................... 725/46 |
| 2010/0293048 A1 | 11/2010 | Singolda et al. | |
| 2012/0192227 A1* | 7/2012 | Fleischman et al. | ........... 725/34 |
| 2012/0215774 A1* | 8/2012 | Finley et al. | .................. 707/728 |
| 2012/0239645 A1* | 9/2012 | Li et al. | ......................... 707/727 |
| 2013/0019262 A1* | 1/2013 | Bhatia et al. | ................... 725/34 |
| 2013/0080445 A1 | 3/2013 | Gogan | |
| 2013/0218907 A1* | 8/2013 | Nice et al. | ..................... 707/751 |
| 2013/0305282 A1* | 11/2013 | Fleischman | ..................... 725/34 |

FOREIGN PATENT DOCUMENTS

WO    2006107883 A2    10/2006

OTHER PUBLICATIONS

European search report for application No. 14002017.3, dated Nov. 19, 2014.

* cited by examiner

*Primary Examiner* — Benjamin R Bruckart
*Assistant Examiner* — Aklil M Tesfaye
(74) *Attorney, Agent, or Firm* — Artegis Law Group, LLP

(57) ABSTRACT

Techniques are described for promoting original media titles. Given metadata tags associated with the original title and other media titles, a tag data matrix is generated and factored into two matrices, one of which includes vectors representing the media titles in a first latent space. Similarity scores are computed between a vector representing the original title and each of the other media title vectors to determine a set of media titles most similar to the original title. Then, a play data matrix is factorized, and an average of vectors representing the most similar titles in a second latent space is taken to be a vector representation of the original title in the second latent space. This representation is compared with representations of users in the second latent space to generate similarity scores, and the original title is then promoted to users associated with the highest similarity scores.

21 Claims, 6 Drawing Sheets ly refers
TARGETED PROMOTION OF ORIGINAL TITLES

TECHNICAL FIELD

Embodiments presented in this disclosure generally relate to computer software. More specifically, embodiments presented herein relate to techniques for promoting new media titles to targeted audiences.

BACKGROUND

A streaming media service generally includes a content server, a content player, and a communications network connecting the content server to the content player. The content server is configured to store (or provide access to) media files (or "streams") made available to end users. Each stream may provide a digital version of a feature length film, a television program, a sporting event, a staged or live event captured by recorded video, and the like. Streams also include media content created specifically for distribution online. Media playback by a client device is typically referred to as "streaming" because the content server transmits portions of a media file to the client device, which in turn decodes and initiates playback without waiting for the complete stream to be received.

Streaming media titles may be promoted to users by various means, such as e-mail, banner ads, billboards, etc. Users are typically chosen as targets of promotion based in part on data collected when other users played and searched for the promoted titles. For example, the play and search data about a promoted title may be used, in conjunction with play and search data for a user, to generate scores indicating whether the user is likely to be interested in the promoted title. However, when new media titles are first released or made available from a streaming media service, play and search data for that title may be unavailable.

BRIEF DESCRIPTION OF THE DRAWINGS

So that the manner in which the above-recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OVERVIEW

Figure 1:
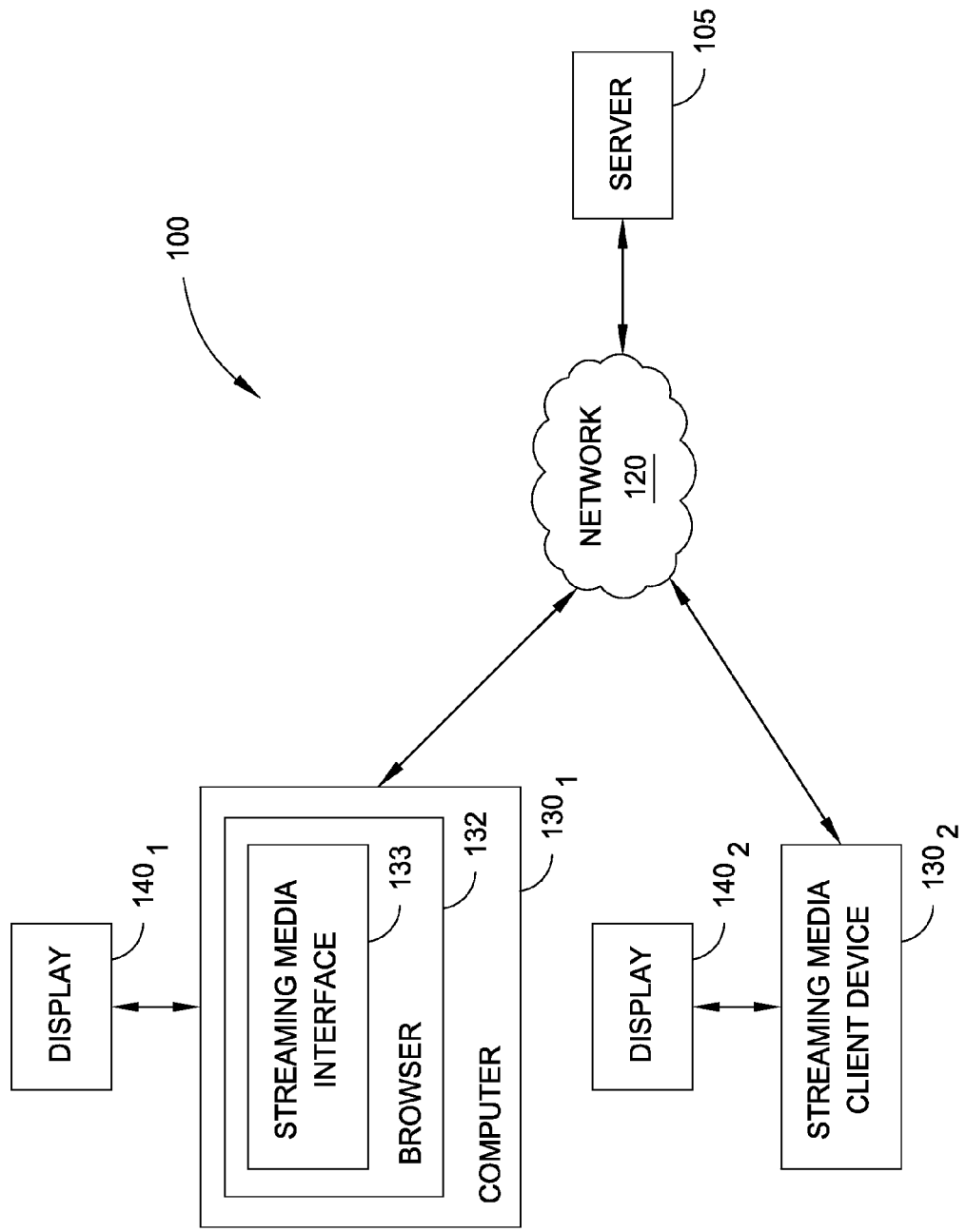
FIG. 1 illustrates an example computing infrastructure used to provide streaming media to a variety of client systems, according to one embodiment of the invention.

Embodiments of the invention provide techniques for selecting users to promote media content to. The techniques include determining scores representing similarities between a given first data type item and each of a plurality of other first data type items as represented in a first latent space. The techniques further include generating a representation of the given first data type item in a second latent space by at least one of (1) averaging representations in the second latent space of a given number of the plurality of other first data type items associated with the highest similarity scores, and (2) solving an objective function to obtain a representation of a dummy user who has viewed the given number of the plurality of other first data type items associated with the highest similarity scores. In addition, the techniques include determining scores representing similarities between the given first data type item and a plurality of users as represented in the second latent space, and directing content that promotes the given first data type item to one or more of the users based on the scores representing similarities between the given first data type item and the users.

Other embodiments include a computer-readable medium that includes instructions that enable a processing unit to implement one or more aspects of the disclosed methods as well as a system configured to implement one or more aspects of the disclosed methods.

DESCRIPTION OF EXAMPLE EMBODIMENTS

Embodiments presented herein provide techniques for selecting when and whether to promote an original title to users. As used herein, an "original title" generally refers to a new media title to be released or made available from a streaming service. In one embodiment, each media title, including original titles, may be associated with metadata tags (e.g., tags describing a title as a "comedy," "romance," "sci-fi," etc.). The metadata tags assigned to a particular title may be made by manually tagging of the media titles. However, tags may also be assigned automatically, e.g., tags may be assigned based on metadata stored in databases related to a given title. Given the metadata tags, a targeted promotion application may generate a tag data matrix whose $(i, t)^{th}$ element is a binary value indicating whether title i is associated with tag t. Of course, the elements of the tag data matrix need not be limited to binary values and may generally include elements that are any real-valued numbers. Further, the role of the rows and columns in matrices discussed herein may be reversed (e.g., the tag data matrix may have elements (t, i) instead), and appropriate modifications made to determine similarity scores, discussed in greater detail below.

The targeted promotion application may factorize the tag data matrix, producing two matrices. Although discussed herein primarily with respect to two matrices, singular value decomposition generally factorizes a matrix into three matrices, the second matrix being a diagonal matrix that can be multiplied with either one of the other matrices to obtain two matrices. While singular value decomposition optimizes the mean squared error as objective function, matrix factorization may generally optimize any objective function, which may be chosen according to the task to be solved. One of the two matrices produced via the factorization may include rows which represent the media titles in a first latent space. The targeted promotion application may compute similarity scores between a row representing the original title and each of the other rows, and rank the similarity scores, to determine a set of media titles most similar to the original title. The similarity scores may be cosine similarity, or any other measure of similarity.

In addition, the targeted promotion application may generate a play data matrix whose $(i, u)^{th}$ element is a binary value (or, more generally, any real value) indicating whether title i has been played by user u and factorize the play data matrix into two matrices. One of the two matrices may include rows which represent the media titles in a second latent space. The other of the two matrices may include columns which represent the users in the second latent space. Note, the media titles and the users are represented in the same, second latent space, and thus their vectors may be compared to one another. In particular, the targeted promotion application may create a vector representing the original title, which may never have been viewed by the users u and thus not represented in the play data matrix, by averaging vectors representing the most similar titles in the second latent space. Alternatively, to create the vector that represents the original title, an objective function (e.g. the same objective function may be used as was used for the initial matrix factorization) may be solved for a "dummy user" who has viewed the most similar titles as determined in the first latent space. The targeted promotion application may then compute similarity scores between the vector representing the original title in the second latent space and the vectors representing the users in the second latent space based on cosine similarity, or another measure of similarity. The original title may then be promoted to users who are most similar to the original title in the second latent space, e.g., users associated with the highest similarity scores (or the lowest scores, as the case may be). The promotions may be any means, including recommendations presented on a streaming media service interface, e-mail, banner ads, billboards, etc.

FIG. 1 illustrates an example computing infrastructure 100 used to provide streaming media content to client systems $130_{1-2}$, according to one embodiment. As shown, the computing infrastructure 100 includes a streaming media server system 105 and client systems $130_1$, $130_2$, each connected to a communications network 120.

The client systems $130_{1-2}$ communicate with the streaming media server system 105 over the network 120 to download streaming media titles. In this particular example, client system $130_1$ represents a computer system running a web-browser 132. Accordingly, client system $130_1$ is representative of desktop PCs, laptop computers, home-theater PCs (HTPCs), tablet computers, mobile telephones, and other computing systems capable of running a web-browser. The web-browser 132 is configured to obtain a streaming media interface 133 from the streaming media server 105, rendered on a display $140_1$, e.g., an LCD monitor.

Streaming media server 105 provides a computing system configured to transmit media streams (or links to media streams) to clients $130_{1-2}$. For example, streaming media server 105 may include a web-server, database, and application server configured to respond to requests for web pages and/or streaming media files received from web-browser 132. The content itself may be distributed from the streaming media server 105 or through broader content distribution networks. For example, in one embodiment, the streaming media server 105 may allow users to authenticate themselves to the streaming media provider (e.g., using a username and password). Once a given user is authenticated, the user may search for media titles by, e.g., entering text queries, and in response to receiving such queries, the streaming media server 105 may generate a set of relevant titles based, at least in part, on distances between media titles, and serve the list to the client device. Similarly, the streaming media server 105 may determine a list of media title recommendations titles based, at least in part, on distances between media titles, and serve the list to the client device. Lists of titles may be transmitted to the interface 133 as a set of links (e.g., HTTP URLs) to streaming media content available from the media server 105 (or related content distribution network). Logic included in the streaming media interface 133 may then begin downloading and playback for one of the titles accessed by one of the links.

Client system $130_2$ represents a set-top device connected to both network 120 and a display 140 (e.g., a flat-panel television). Accordingly, client system $130_2$ is representative of digital cable boxes, digital video recorder (DVR) systems, video game consoles, and other streaming media devices, as well as DVD players capable of connecting to a network 120 and receiving and playing back media streams provided by media server 105. For example, some Blu-ray® disc players can download and execute BD-live applications. In such a case, the disc player could connect to the media server 105 and download interface components used to select and playback media streams. Further, display 140 may itself be an integrated device capable of connecting to the network 120 playing back media streams supplied by the media server 105. For example, some flat-panel television displays include integrated components used to connect to a streaming media service, video on demand services, or video sharing websites.

Figure 2:
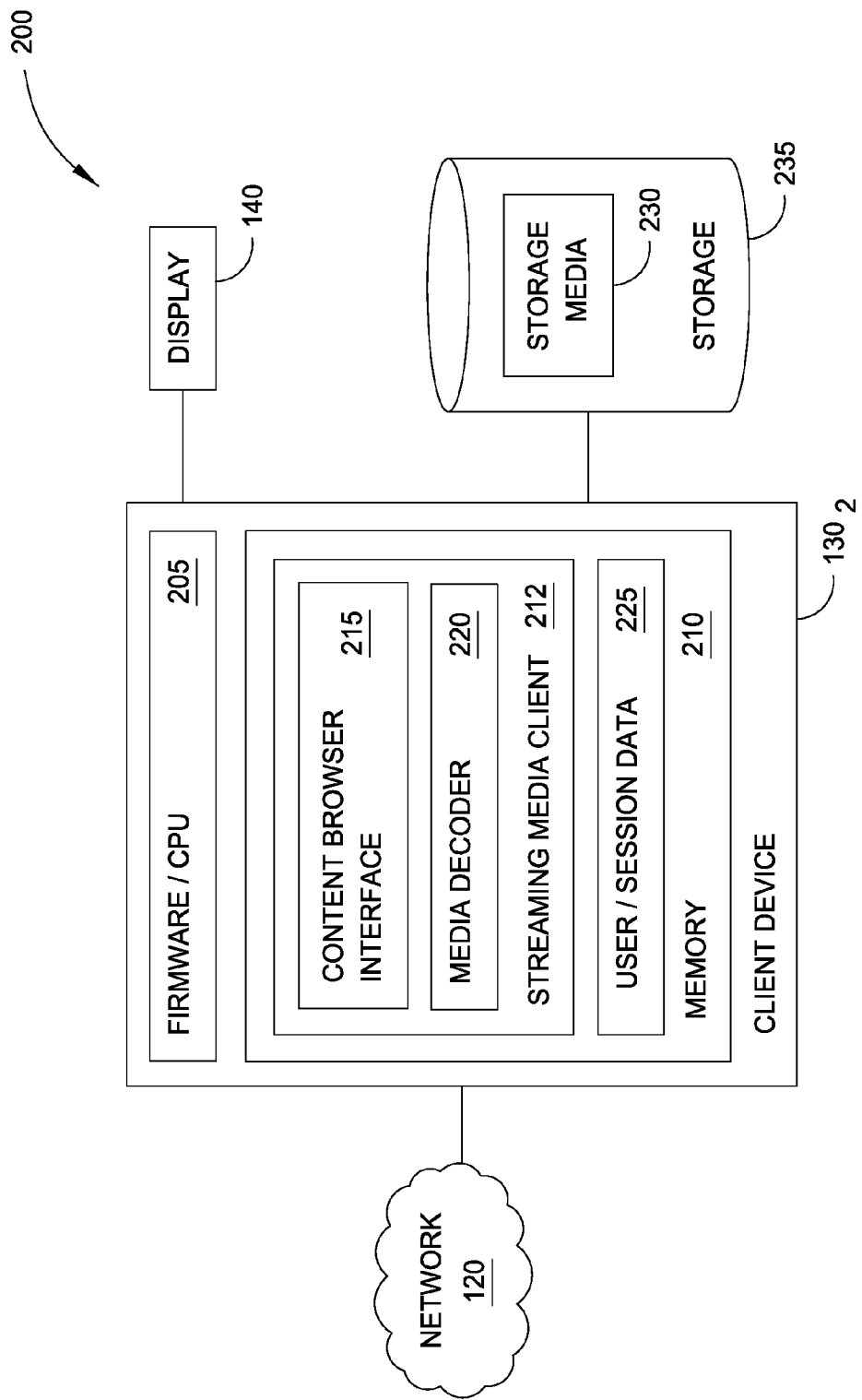
FIG. 2 illustrates an example client device used to enter search queries and to view streaming media content, according to one embodiment of the invention.

FIG. 2 illustrates an example of a client device $130_2$ used to view streaming media content, according to one embodiment. In this example, a streaming media client device is connected to both a display screen (e.g., a flat panel television) and a network. Accordingly, as shown, the client device $130_2$ is connected to both a network 120 and to a display 140. Note, client device $130_2$ is included to be representative of a cable-set top box, a digital video recorder (DVR), or television with integrated streaming functionality, as well as dedicated streaming devices (e.g., a Roku® device) connected to a television display. However configured, the client device $130_2$ may be capable of streaming media content from a variety of different service providers. Client device $130_2$ is also shown connected to a storage repository 235 of stored media 230, representing locally stored content that is available for playback on display 140.

In one embodiment, the client device $130_2$ is configured to allow users to view media content streamed over network 120 using a content browsing interface 215. As shown, the client device $130_2$ includes firmware 205, memory 210, and storage 235. The firmware 205 represents operating logic used to control the client device $130_2$. For example, the firmware 205 may be configured to allow users to schedule recordings, connect to streaming media services, select content for playback, etc. Content retrieved over the network 120 may be buffered in storage 235 prior to being decoded and presented on display 140.

Illustratively, the memory 210 includes user/session data 215 and a media client 212, which itself includes a media decoder 220 and a content browsing interface 215. The streaming media client 212 provides software on the client device $130_2$ used to access a given streaming media service. And the media decoder 220 is generally configured to decode and generate display frames from data streamed over the network 120, whether as part of content browsing interface 215 or otherwise. In one embodiment, the content browsing interface 215 may be configured to connect to a streaming media service, authenticate itself, e.g., using credentials entered by a user or stored as part of user/session data 225, and allow a user to select content to view on display 140.

Figure 3:
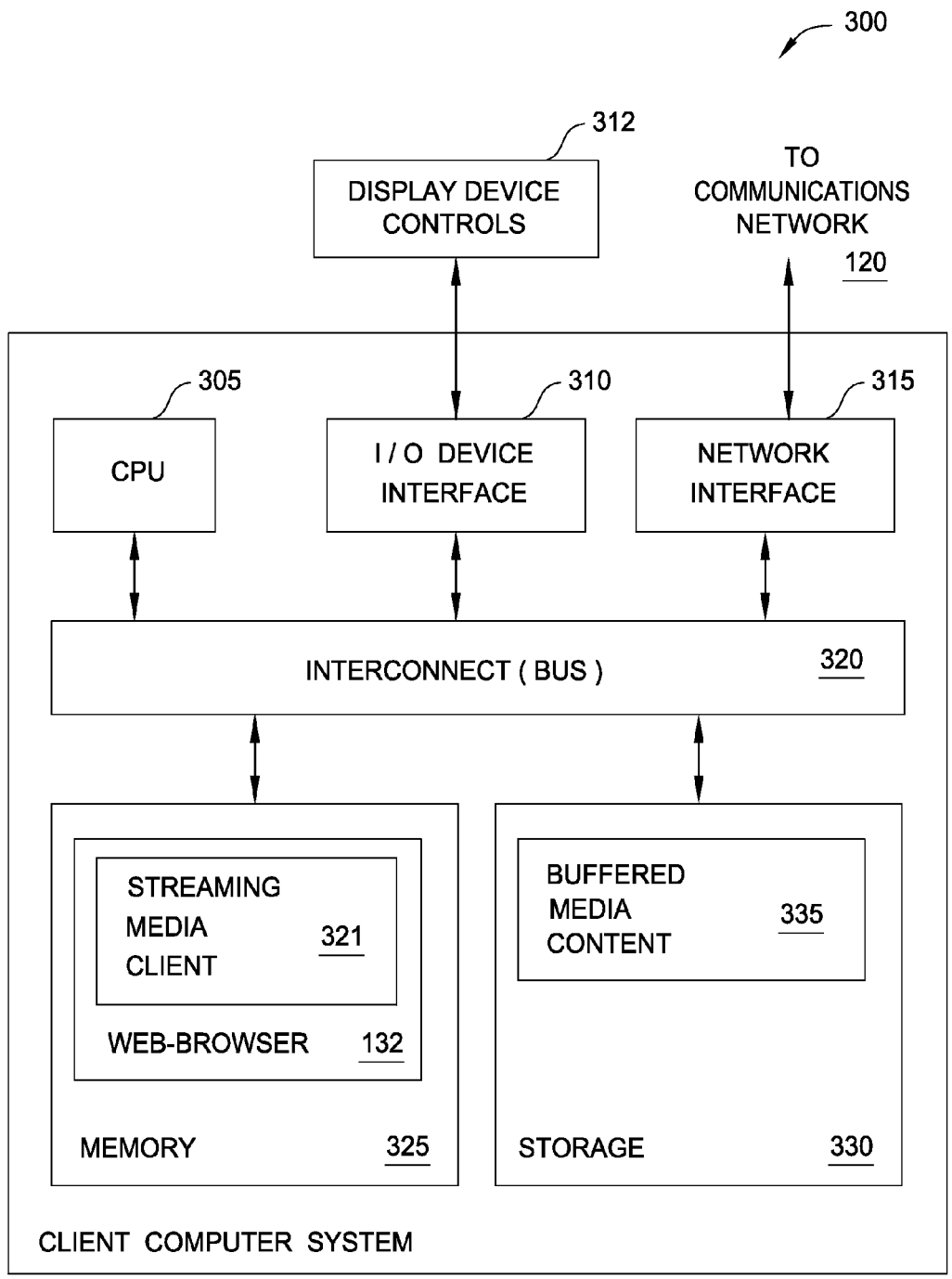
FIG. 3 illustrates an example computing system used to view streaming media content, according to one embodiment of the invention.

FIG. 3 illustrates an example of a client computing system 130$_1$ used to view streaming media content, according to one embodiment. As shown, the client computing system 130$_1$ includes, without limitation, a central processing unit (CPU) 305, a network interface 315, a bus 320, a memory 325, and storage 330. The computing system 130$_1$ also includes an I/O device interface 310 connecting I/O devices 312 to the computing system 130$_1$ (e.g., a keyboard, mouse, or remote control, along with a monitor (e.g., an LCD panel)).

CPU 305 is included to be representative of a single CPU, multiple CPUs, a single CPU having multiple processing cores, etc., and the memory 325 is included to be representative of a random access memory. The bus 320 connects CPU 305, I/O devices interface 310, storage 330, network interface 315, and memory 325. The network interface 315 is configured to transmit data via the communications network 120, e.g., to stream media from the server system 105. Storage 330, such as a hard disk drive or solid-state (SSD) storage drive, may store audio video data files along with other content.

Illustratively, the memory 325 includes a web browser 132, which itself includes a streaming media client 321, and the storage 330 stores buffered media content 335. The browser 132 provides a software application which allows a user to access web pages and other content hosted by a server. In particular, the browser 132 may permit the user to enter search queries for transmission to the server via the network 120. The streaming media client 321 generally corresponds to software components retrieved from a streaming media service in order to playback media content from that streaming media service. Content downloaded from the streaming media service may be stored in storage 330 (or in memory 325) as buffered media content 335 prior to being decoded and played back by streaming media client 321.

Figure 4:
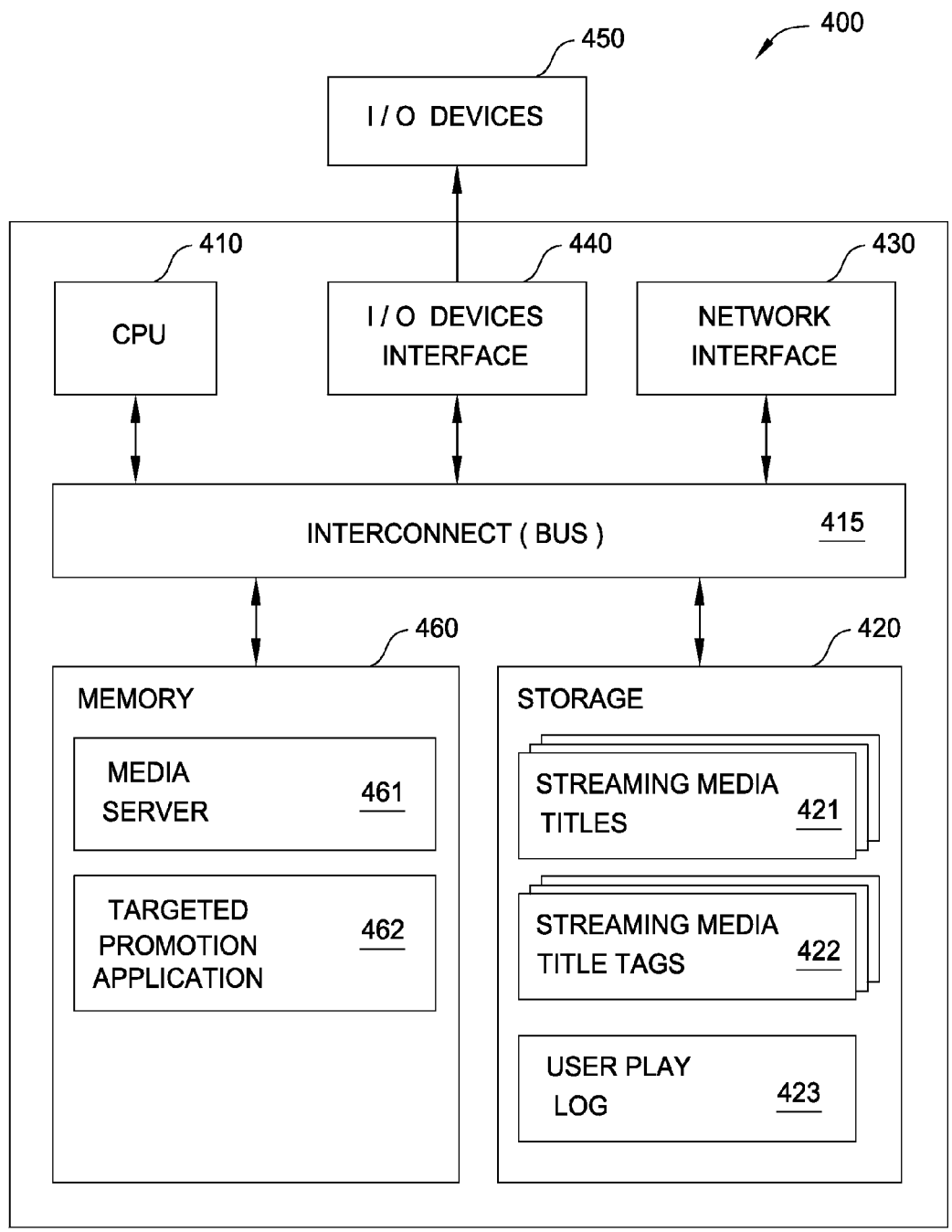
FIG. 4 illustrates an example computing system on which an application that determines users to promote an original title to may run, according to one embodiment of the invention.

FIG. 4 illustrates an example computing system on which an application that determines users to promote an original title to may run, according to one embodiment of the invention. As shown, computer server 105 includes, without limitation, a central processing unit (CPU) 410, a network interface 430, a bus 415, a memory 460, and storage 230. The content server system 105 also includes an I/O device interface 440 to devices 450 (e.g., keyboard, display and mouse devices).

CPU 410 retrieves and executes programming instructions stored in the memory 460. Similarly, CPU 410 stores and retrieves application data residing in the memory 460. The bus 415 is used to transmit programming instructions and application data between the CPU 410, I/O devices interface 440, storage 230, network interface 430, and memory 460. CPU 410 is included to be representative of a single CPU, multiple CPUs, a single CPU having multiple processing cores, and the like. And the memory 460 is generally included to be representative of a random access memory. The storage 230 may be a disk drive storage device. Although shown as a single unit, the storage 230 may be a combination of fixed and/or removable storage devices, such as magnetic disc drives, solid state drives (SSD), removable memory cards, optical storage, network attached storage (NAS), or a storage area-network (SAN).

Illustratively, the memory 460 includes a media server 461 which serves streaming media titles to client devices. Storage 230 includes streaming media titles 421, a user activity log 422, and media title metadata 423. Streaming media titles 421 provide a library of media content available for streaming. Accordingly, the streaming media titles 421 may include a collection of audio/video data encoded at various bitrates and stored on the content server system 105. Alternatively, the streaming media titles 421 may include metadata describing the actual media files, which may be made available from a content distribution network. In such a case, the media server 461 may be configured to, e.g., generate a license used by a client to obtain a given streaming media title from the content distribution network.

User plays log 423 is representative of one or more log files which store user/session data relating to views of media titles by users. For example, each element in the log 423 may include a user ID, an ID of a media title viewed by the user, and timestamps of when the viewing started and ended.

As shown, the memory 460 also includes a targeted promotion application 462 which determines similarity scores representing how likely a user is to be interested in a given original title. As discussed in greater detail below, the similarity scores may be determined based on the tag metadata 422 and data from the user play logs 423. In one embodiment, the targeted promotion application 424 may determine the similarity scores according to method 600, discussed below. Given the similarity scores, promotion may be targeted to users who are most similar to the original title in the second latent space, e.g., users associated with the highest (or lowest, as the case may be) similarity scores. The promotions may be any means, including recommendations presented on a streaming media service interface, e-mail, banner ads, billboards, etc.

Figure 5:
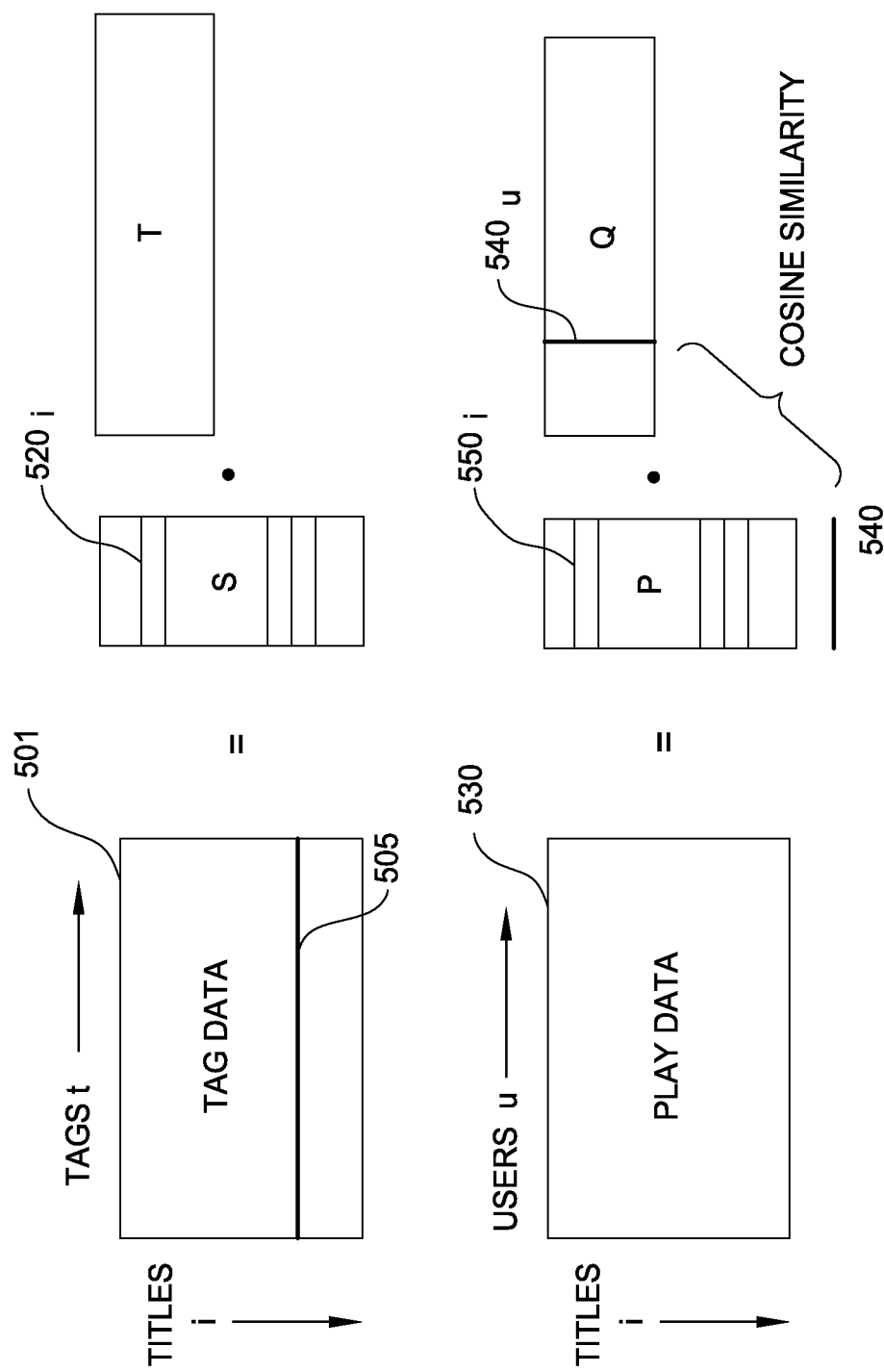
FIG. 5 illustrates an approach for determining users to promote an original title to, according to an embodiment of the invention.

FIG. 5 illustrates an approach for selecting users to promote an original title to, according to an embodiment. Given titles i and tags t, a targeted promotion application (not shown) may generate a tag data matrix 501. As shown in panel A, the tag data matrix 501 has rows, each representing a title i, and columns corresponding to tags t. The (i, t)$^{th}$ element of tag matrix 501 element may be a binary value (or, more generally, any real value) indicating an association of title i with tag t, or lack thereof (e.g., whether title i has been tagged with tag t). In such a case, most of the elements (i, t) may equal 0, i.e., the data may be sparse, making it difficult to compare two media titles represented by different rows with each other.

Illustratively, the targeted promotion application may receive tag data pertaining to an original title, and add a row 505 representing the original title to the tag data matrix 501. In addition, the targeted promotion application may factorize the tag data matrix 501 into two matrices S and T, where the dot product S·T approximates the tag data matrix 501. Any technique may be used to factorize the tag data matrix 501, including well-known factorization techniques. In some embodiments, the factorization technique used may produce terms other than the matrices S and T, such as a constant offset term. Here, rows of matrix S may be representations of media titles in a first latent space. The number of columns of S is the dimension of the first latent space. This dimension may be less than the number of tags, and sufficiently small to avoid the sparsity problem described above. Conversely, the number of rows of T equals the number of columns of S and is also the dimension of the first latent space, and the columns of S represent the tags in the latent space.

Given the matrix factorization, the targeted promotion application may compare two media titles by determining a similarity between rows of the matrix S that represent those media titles. In one embodiment, the similarity measurement used may be cosine similarity, in which an angular distance in the first latent space between the media titles row vectors is determined. Of course, alternative measures of similarity may also be used. The targeted promotion application may determine similarity scores between the vector representing the original title and each of the other media title vectors in the first latent space, rank those similarity scores, and select a given number (e.g., 30) of the media titles whose vectors $520_i$ are most similar to the original title's vector in the first latent space, referred to herein as the most similar media titles.

Similar to tag data matrix 505, panel B shows a play data matrix 530 whose $(i, u)^{th}$ element indicates whether title i was viewed by user u. The original title may not be represented in the play data matrix 530, as the original title was not previously publicly available, and thus no users were able to view it. The targeted promotion application factors the play data matrix 530, producing matrices P and Q. Here, row vectors of matrix P may be representations of media titles in a second latent space, while column vectors of matrix Q may represent users in the second latent space. The number of columns of matrix P equals the number of rows of matrix Q and is the dimension of the latent space. Note, media titles and users are represented in the same, second latent space, and may thus be compared with each other. The second latent space is distinct from the first latent space discussed above with respect to panel A, and embodiments disclosed herein bridge these latent spaces to overcome the fact that no users have previously viewed the original title.

The targeted promotion application may generate a vector 550 representing the original title in the second latent space by averaging row vectors of the matrix P that represent the most similar titles. In one embodiment, an unweighted average may be used. In another embodiment, a weighted average may be used, such as an average in which each row is weighted by the similarity score for the title whose views are represented by that row. Equivalently, the vector representing the original title may be obtained as the vector of a "dummy user" in the second latent space, with the play vector representing the "dummy user" including the most similar media titles from the first latent space. In one embodiment, an objective function (e.g. the same objective function used for the initial matrix factorization) may be solved for a "dummy user" who has viewed the most similar titles as determined in the first latent space.

Given, the vector 550, the targeted promotion application may compute a similarity score between the vector 550 and column vectors $540_u$ in matrix Q representing users in the second latent space. In one embodiment, the similarity score may be determined using cosine similarity, in which an angular distance between the vector 550 and the vectors $540_u$ in the second latent space is determined. Alternative measures of similarity may also be used.

After determining the similarity scores, the targeted promotion application may rank those scores and select a given number (e.g., 1000) of users represented by columns $540_u$ associated with the highest similarity scores to target promotion to. Thereafter, the original title may be promoted to the selected users by any feasible promotion means, such as recommendations presented on a streaming media service interface, e-mail, banner ads, billboards, etc.

Figure 6:
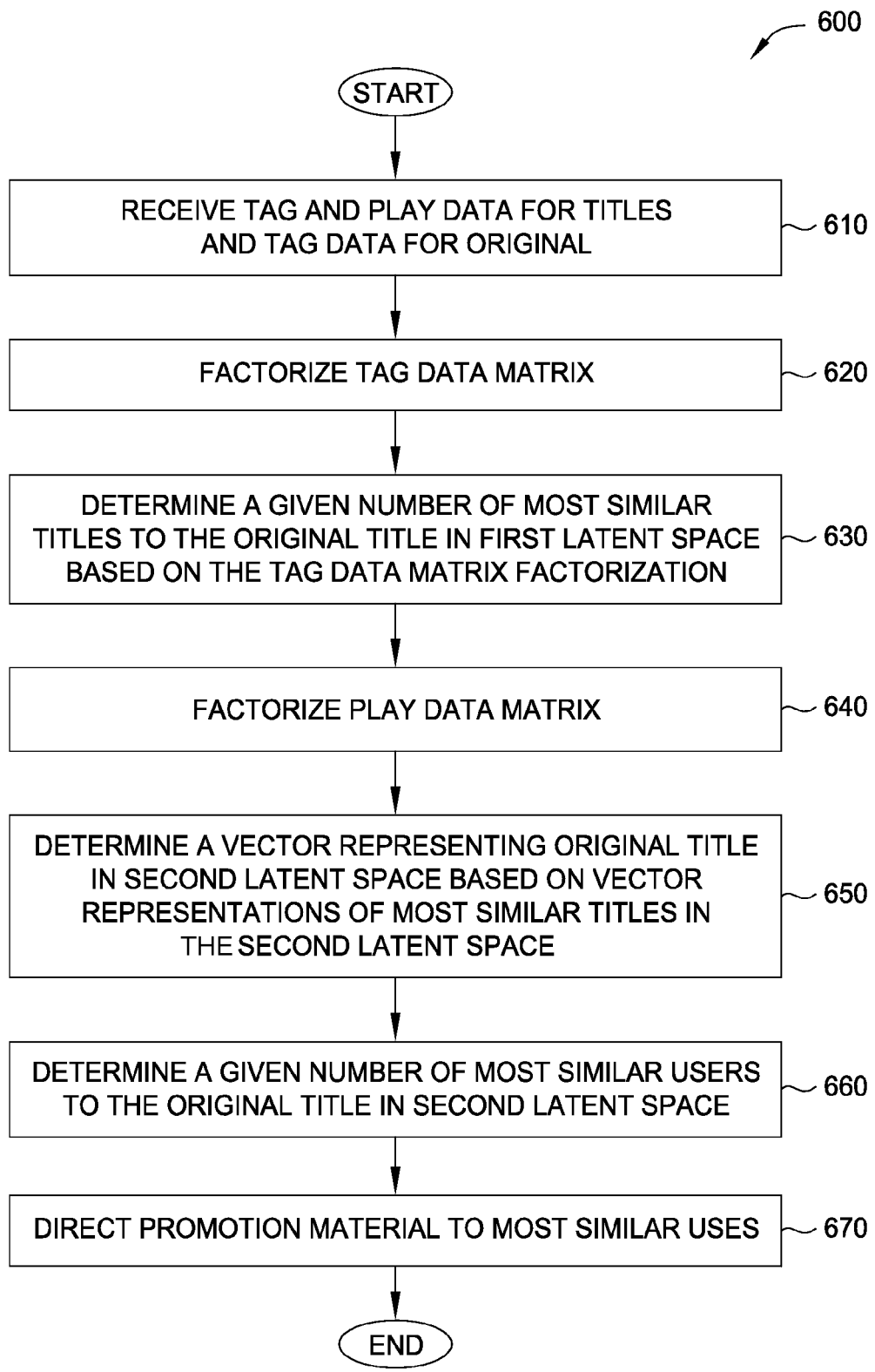
FIG. 6 illustrates a method for determining a score which reflects how likely a user is to be interested in an original title, according to an embodiment of the invention.

FIG. 6 illustrates a method 600 for determining a score which reflects how likely a user is to be interested in an original title, according to an embodiment. As shown, the method 600 begins at step 610, where a targeted promotion application receives tag and viewing data for titles and tag data for an original title. At step 620, the targeted promotion application factors a tag data matrix 501. In one embodiment, the tag data matrix 501 may be generated with the $(i, t)^{th}$ element of the matrix being a binary value (or, more generally, any real number) indicating an association of title i with tag t, if any. Any feasible means may be used to factorize the tag data matrix 501, including well-know matrix factorization techniques. In one embodiment, the result of the matrix factorization may include two matrices, S and T which, when multiplied, give an approximation to the tag data matrix 501. As discussed, row vectors of matrix S may be representations of media titles in a first latent space, with the number of columns of S being the dimension of the first latent space.

At step 630, the targeted promotion application determines a given number of most similar titles to the original title based on the tag data matrix factorization. In one embodiment, the matrix S may include row vectors which represent media titles in a first latent space. In such a case, the targeted promotion application may compute similarities scores between a row vector representing the original title in matrix S and other row vectors of matrix S, which represent other media titles, rank those similarity scores, and select a given number media titles (e.g., 30) associated with the highest (or lowest, as the case may be) scores. Any measure of similarity may be used, such as cosine similarity.

At step 640, the targeted promotion application factors play data matrix 530. In one embodiment, the play data matrix 530 may be generated with the $(i, u)^{th}$ element of the matrix being a binary value indicating whether title i has been played by user u. As discussed, real-valued or integer-valued entries of the matrix may be used instead of binary values in some embodiments. The result of the matrix factorization may include two matrices, P and Q which, when multiplied, give an approximation to the play matrix 530. In one embodiment, rows of matrix P may be representations of media titles in a second latent space, while columns of matrix Q may represent users in the second latent space.

At step 650, the targeted promotion application determines a vector 550 which represents the original title in the second latent space based on the vector representations of most similar media titles in the second latent space. In one embodiment, the targeted promotion application may average the row vectors of the matrix P that represent the most similar media titles in the second latent space. The average may be an unweighted average, or a weighted average in which, e.g., a vector representing a given media title is weighted by the similarity score for that media title. The number of row vectors averaged may differ, depending on circumstances. Experience has shown that averaging 30 rows representing most similar media titles works well in some cases. As discussed, the vector representing the original title may also be obtained as the vector of a "dummy user" in the second latent space, with the play vector representing the "dummy user" including the most similar media titles from the first latent space. In one embodiment, an objective function (e.g. the same objective function used for the initial matrix factorization) may be solved for a "dummy user" who has viewed the most similar titles as determined in the first latent space.

At step 660, the targeted promotion application determines a given number (e.g., 1000) of most similar users to the original title in the second latent space. In one embodiment, the targeted promotion application may compute a similarity score between the vector 550 and column vectors 550$_u$ in matrix Q representing users in the second latent space. For example, the similarity score may be determined using cosine similarity, in which angular distances between the vector 550 and the column vectors 540$_u$ in the second latent space are determined. Alternative measures of similarity may also be used.

At step 670, the targeted promotion application directs promotional material to the given number of most similar users determined at step 660. The promotional material may be of any kind, such as recommendations, e-mails, banner ads, etc. In other embodiments, physical promotional materials, such as billboards, TV ads, mail flyers, etc. may also be directed to the most similar users.

Although discussed above primarily with respect to targeted promotion of original media titles for which user viewing data is unavailable, the data sets could be different in other embodiments. For example, user views and searches may both be used, and the length of user views may also be considered. Further, the data sets may include any type of data, which need not relate to media titles. For example, other new products may be targeted for promotion using techniques disclosed herein.

Advantageously, embodiments presented herein provide techniques for promoting content to users. One embodiment permits an original media title, for which play and search data are unavailable, to be promoted to users who are most likely to be interested in viewing the original title. In other embodiments, new products other than original media titles may be promoted to a targeted audience using similar techniques.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

What is claimed is:

1. A computer-implemented method comprising:
    determining scores representing similarities between a given first data type item and each of a plurality of other first data type items as represented in a first latent space;
    generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores;
    determining scores representing similarities between the given first data type item and a plurality of users as represented in the second latent space; and
    directing content that promotes the given first data type item to one or more of the users based on the scores representing similarities between the given first data type item and the users.

2. The method of claim 1, wherein averaging representations in the second latent space of one or more of the plurality of the other first data type items includes taking a weighted average.

3. The method of claim 1, wherein the content that promotes the given first data type item includes at least one of recommendations, e-mails, banner ads, and billboards.

4. The method of claim 1, wherein the representation of the given first data type item and the representations of the plurality of other first data type items are vector representations.

5. A computer-implemented method comprising:
    determining scores representing similarities between a given first data type item and each of a plurality of other first data type items including:
        factorizing a first matrix to generate at least a second matrix and a third matrix, the first matrix including vectors representing the first data type, and
        determining, based on a comparison of vectors in the second matrix the scores representing similarities between the given first data type item and the plurality of other first data type items;
    generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores, including:
        factorizing a fourth matrix to generate at least a fifth matrix and a sixth matrix, the fourth matrix including row vectors and column vectors representing the first data type and the users, and
        generating a first vector which is an average of, or is obtained as a dummy user vector of, a given number of vectors in the fifth matrix that represent the plurality of first data type items associated with the highest similarity scores;
    determining scores representing similarities between the given first data type item and a plurality of users as represented in the second latent space including determining scores each of which indicates a degree of similarity between the first vector and the vectors in the sixth matrix that represent users; and
    directing content that promotes the given first data type item to one or more of the users based on the scores representing similarities between the given first data type item and the users.

6. The method of claim 5, wherein the first data type items are streaming media titles.

7. The method of claim 6, wherein the first matrix is a tag matrix, each element of the tag matrix indicating whether one of the streaming media titles is associated with one of a plurality of metadata tags, and wherein the fourth matrix is a play matrix, each element of the play matrix indicating whether one of the users has played one of the streaming media titles.

8. The method of claim 5, wherein the scores representing similarities between the given first data type item and the plurality of other first data type items and the scores representing similarities between the given first data type item and the users are determined using cosine similarity.

9. A non-transitory computer-readable storage media storing instructions, which when executed by a computer system, perform operations comprising:
  determining scores representing similarities between a given first data type item and each of a plurality of other first data type items as represented in a first latent space;
  generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores;
  determining scores representing similarities between the given first data type item and a plurality of users as represented in the second latent space; and
  directing content that promotes the given first data type item to one or more of the users based on the scores representing similarities between the given first data type item and the users.

10. The computer-readable storage media of claim 9, wherein averaging representations in the second latent space of one or more of the plurality of the other first data type items includes taking a weighted average.

11. The computer-readable storage media of claim 9, wherein the content that promotes the given first data type item includes at least one of recommendations, e-mails, banner ads, and billboards.

12. A non-transitory computer-readable storage media storing instructions, which when executed by a computer system, perform operations comprising:
  determining scores representing similarities between a given first data type item and each of a plurality of other first data type items including:
    factorizing a first matrix to generate at least a second matrix and a third matrix, the first matrix including vectors representing the first data type, and
    determining, based on a comparison of vectors in the second matrix, the scores representing similarities between the given first data type item and the plurality of other first data type items;
  generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores, including:
    factorizing a fourth matrix to generate at least a fifth matrix and a sixth matrix, the fourth matrix including row vectors and column vectors representing the first data type and the users, and
    generating a first vector which is an average of, or is obtained as a dummy user vector of, a given number of vectors in the fifth matrix that represent the plurality of first data type items associated with the highest similarity scores;
  determining scores representing similarities between the given first data type item and a plurality of users as represented in the second latent space including determining scores each of which indicates a degree of similarity between the first vector and the vectors in the sixth matrix that represent users; and
  directing content that promotes the given first data type item to one or more of the users based on the scores representing similarities between the given first data type item and the users.

13. The computer-readable storage media of claim 12, wherein the first data type items are streaming media titles.

14. The computer-readable storage media of claim 13, wherein the first matrix is a tag matrix, each element of the tag matrix indicating whether one of the streaming media titles is associated with one of a plurality of metadata tags, and wherein the fourth matrix is a play matrix, each element of the play matrix indicating whether one of the users has played one of the streaming media titles.

15. The computer-readable storage media of claim 12, wherein the scores representing similarities between the given first data type item and the plurality of other first data type items and the scores representing similarities between the given first data type item and the users are determined using cosine similarity.

16. A system, comprising:
  a processor; and
  a memory, wherein the memory includes an application program configured to perform operations comprising:
    determining scores representing similarities between a given first data type item and each of a plurality of other first data type items as represented in a first latent space,
    generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores,
    determining scores representing similarities between the given first data type item and a plurality of users as represented in the second latent space, and
    directing content that promotes the given first data type item to one or more of the users based on the scores representing similarities between the given first data type item and the users.

17. The system of claim 16, wherein averaging representations in the second latent space of one or more of the plurality of the other first data type items includes taking a weighted average.

18. A system, comprising:
  a processor; and
  a memory, wherein the memory includes an application program configured to perform operations comprising:
    determining scores representing similarities between a given first data type item and each of a plurality of other first data type items including:

factorizing a first matrix to generate at least a second matrix and a third matrix, the first matrix including vectors representing the first data type, and determining, based on a comparison of vectors in the second matrix, the scores representing similarities between the given first data type item and the plurality of other first data type items;

generating a representation of the given first data type item in a second latent space by at least one of averaging representations in the second latent space of a given number of the plurality of other first data type items associated with the highest similarity scores, and solving an objective function to obtain a representation of a dummy user who has viewed the given number of the plurality of other first data type items associated with the highest similarity scores, including:

factorizing a fourth matrix to generate at least a fifth matrix and a sixth matrix, the fourth matrix including row vectors and column vectors representing the first data type and the users, and generating a first vector which is an average of, or is obtained as a dummy user vector of, a given number of vectors in the fifth matrix that represent the plurality of first data type items associated with the highest similarity scores;

determining scores representing similarities between the given first data type item and a plurality of users as represented in the second latent space including determining scores each of which indicates a degree of similarity between the first vector and the vectors in the sixth matrix that represent users; and directing content that promotes the given first data type item to one or more of the users based on the scores representing similarities between the given first data type item and the users.

19. The system of claim 18, wherein the first data type items are streaming media titles.

20. The system of claim 19, wherein the first matrix is a tag matrix, each element of the tag matrix indicating whether one of the streaming media titles is associated with one of a plurality of metadata tags, and wherein the fourth matrix is a play matrix, each element of the play matrix indicating whether one of the users has played one of the streaming media titles.

21. The system of claim 18, wherein the scores representing similarities between the given first data type item and the plurality of other first data type items and the scores representing similarities between the given first data type item and the users are determined using cosine similarity.

* * * * *